(12) United States Patent
Park et al.

(10) Patent No.: US 9,100,777 B2
(45) Date of Patent: Aug. 4, 2015

(54) METHOD AND APPARATUS FOR CONTROLLING DEVICE

(75) Inventors: Yong-gook Park, Gyeonggi-do (KR); Tae-young Kang, Seoul (KR); Jung-ho Kim, Chungcheongnam-do (KR); Joo-yoon Bae, Seoul (KR); Ho-jun Lee, Gyeonggi-do (KR); Hee-chul Jeon, Gyeonggi-do (KR); Sang-ok Cha, Daegu (KR); Won-young Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 34 days.

(21) Appl. No.: 13/588,407

(22) Filed: Aug. 17, 2012

(65) Prior Publication Data

US 2013/0095790 A1    Apr. 18, 2013

(30) Foreign Application Priority Data

Oct. 14, 2011    (KR) .................. 10-2011-0105526

(51) Int. Cl.
| | |
|---|---|
| *H04M 1/66* | (2006.01) |
| *H04B 5/00* | (2006.01) |
| *H04L 9/32* | (2006.01) |
| *H04W 4/02* | (2009.01) |
| *H04W 12/12* | (2009.01) |
| *H04W 4/00* | (2009.01) |
| *H04M 1/725* | (2006.01) |

(52) U.S. Cl.
CPC .. *H04W 4/02* (2013.01); *H04L 9/32* (2013.01); *H04M 1/7253* (2013.01); *H04M 2250/04* (2013.01); *H04M 2250/10* (2013.01); *H04M 2250/12* (2013.01); *H04W 4/008* (2013.01); *H04W 12/12* (2013.01); *Y02B 60/50* (2013.01)

(58) Field of Classification Search
USPC ................. 455/411, 41.1, 41.2; 370/331
See application file for complete search history.

(56) References Cited

U.S. PATENT DOCUMENTS

| | | | |
|---|---|---|---|
| 7,369,862 B2 | 5/2008 | Kim et al. | |
| 7,885,639 B1* | 2/2011 | Satish et al. | 455/410 |
| 8,176,328 B2* | 5/2012 | Chen et al. | 713/176 |
| 2008/0090520 A1* | 4/2008 | Camp et al. | 455/41.2 |
| 2009/0100530 A1 | 4/2009 | Chen | |
| 2009/0143080 A1 | 6/2009 | Brede et al. | |

(Continued)

FOREIGN PATENT DOCUMENTS

| | | |
|---|---|---|
| EP | 1 727 109 | 11/2006 |
| FR | 2 820 597 | 8/2002 |
| JP | 2003163629 | 6/2003 |

(Continued)

OTHER PUBLICATIONS

European Search Report dated May 28, 2015 issued in counterpart application No. 12839943.3-1853.

*Primary Examiner* — William Nealon
(74) *Attorney, Agent, or Firm* — The Farrell Law Firm, P.C.

(57) ABSTRACT

A method and an apparatus for controlling a device are provided. Information regarding a second external device, which was received by a first external device, is received from the first external device. The second external device is authenticated based on the information regarding the second external device. Position information regarding the second external device is detected. Control information regarding the first external device is transmitted to the first external device. The control information is based on the position information.

13 Claims, 4 Drawing Sheets

(56) References Cited

U.S. PATENT DOCUMENTS

2012/0094597 A1* 4/2012 Tysowski .................. 455/41.1
2013/0095751 A1* 4/2013 Kasslin et al. ............. 455/41.1

FOREIGN PATENT DOCUMENTS

KR 1020100122978 11/2010
WO WO 2006/095212 9/2006

* cited by examiner

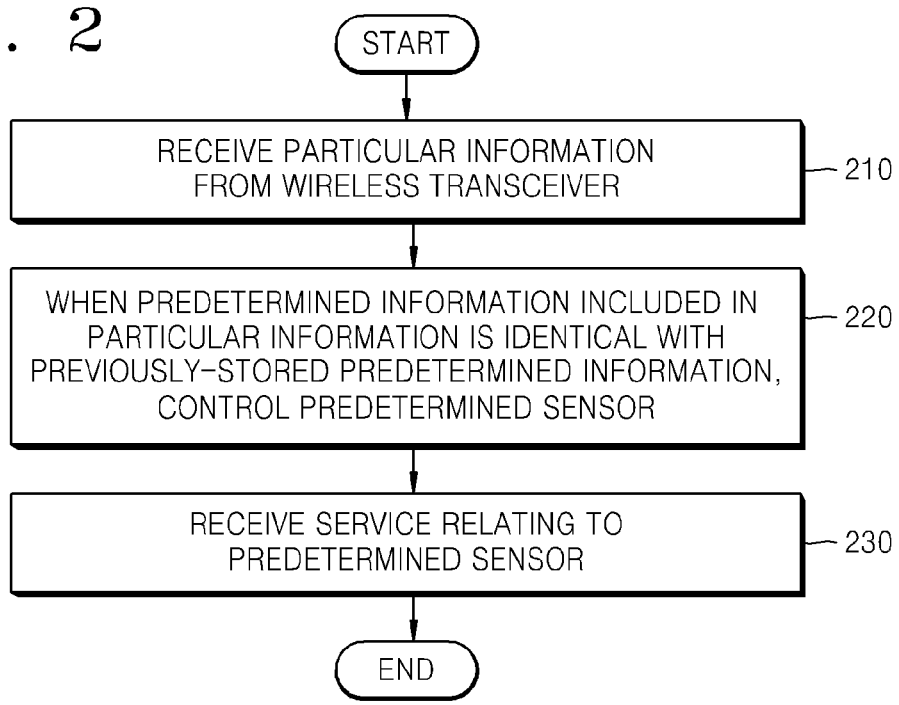
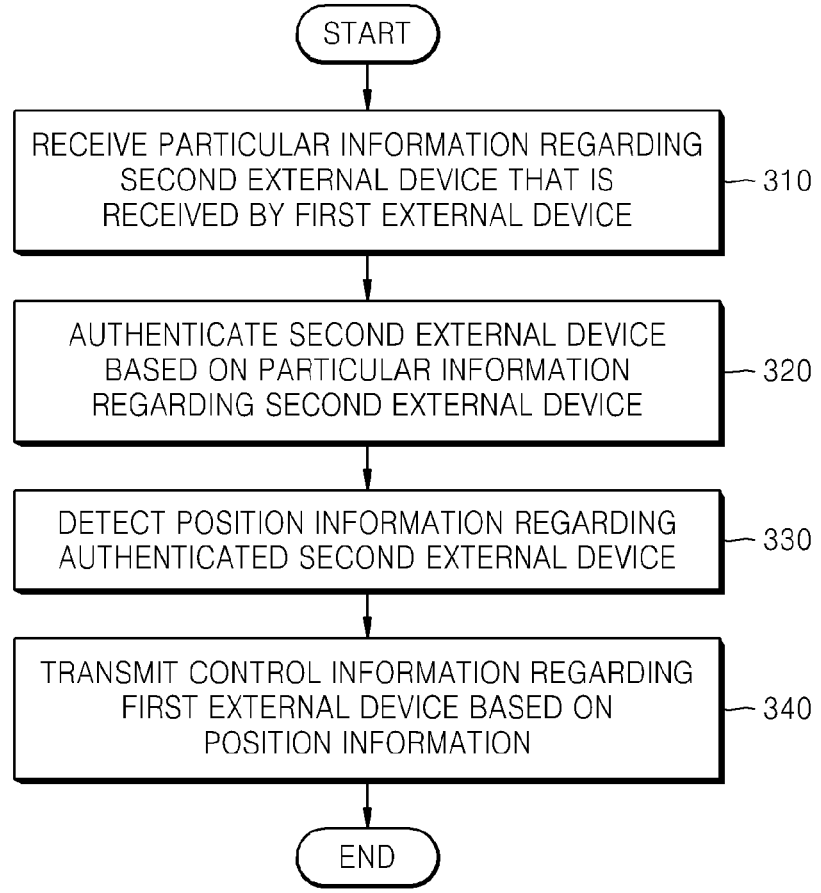

METHOD AND APPARATUS FOR CONTROLLING DEVICE

PRIORITY

This application claims priority under 35 U.S.C. §119(a) to Korean Patent Application No. 10-2011-0105526, filed in the Korean Intellectual Property Office on Oct. 14, 2011, the disclosure of which is incorporated herein by reference.

BACKGROUND OF THE INVENTION

1. Field of the Invention

The present invention relates generally to a method and apparatus for controlling a device, and more particularly, to a method and apparatus for controlling a sensor of a device in a particular zone.

2. Description of the Related Art

Near Field Communication (NFC) technologies have recently been applied to mobile phones. NFC technologies allow bidirectional communication between devices within a very short distance and are used in various services, such as, for example, traffic cards, ticketing, money transaction, and the like. The usage of NFC technologies is continuously increasing.

Due to many applications, services, and settings that are available on smartphones, it is difficult for a user to select a particular function from among the many functions that exist.

SUMMARY OF THE INVENTION

The present invention has been made to address at least the above problems and/or disadvantages and to provide at least the advantages described below. Accordingly, an aspect of the present invention provides a method and apparatus for controlling a device, whereby an intelligent User eXperience (UX) that intelligently responds to a user's situation is provided with location-based services and only a necessary sensor is operated stepwise in a particular area of service so as to minimize power consumption of an engine that recognizes a context.

According to an aspect of the present invention, a method of controlling a device is provided. Information regarding a second external device, which was received by a first external device, is received from the first external device. The second external device is authenticated based on the information regarding the second external device. Position information regarding the second external device is detected. Control information regarding the first external device is transmitted to the first external device. The control information is based on the position information.

According to another aspect of the present invention, an apparatus is provided for controlling a device. The apparatus includes a communication unit for receiving, from a first external device, particular information regarding a second external device, which was received by the first external device. The apparatus also includes a control unit for authenticating the second external device based on the information regarding the second external device, detecting position information regarding the second external device, and transmitting, to the first external device, control information regarding the first external device. The control information is based on the position information.

According to an additional aspect of the present invention, a computer-readable recording medium is provided having recorded thereon a program for executing a method of controlling a device. The method comprises the operations of: receiving, from first external device, information regarding a second external device, which was received by the first external device; authenticating the second external device based on the information regarding the second external device; detecting position information regarding the second external device; and transmitting, to the first external device, control information regarding the first external device, wherein the control information is based on the position information.

BRIEF DESCRIPTION OF THE DRAWINGS

The above and other aspects, features and advantages of the present invention will become more apparent from the following detailed description when taken in conjunction with the accompanying drawings in which:

FIG. 2 is a flowchart illustrating a method of controlling a device, according to an embodiment of the present invention;

FIG. 3 is a flowchart illustrating a method of controlling a device, according to another embodiment of the present invention;

DETAILED DESCRIPTION OF EMBODIMENTS OF THE PRESENT INVENTION

Figure 1:
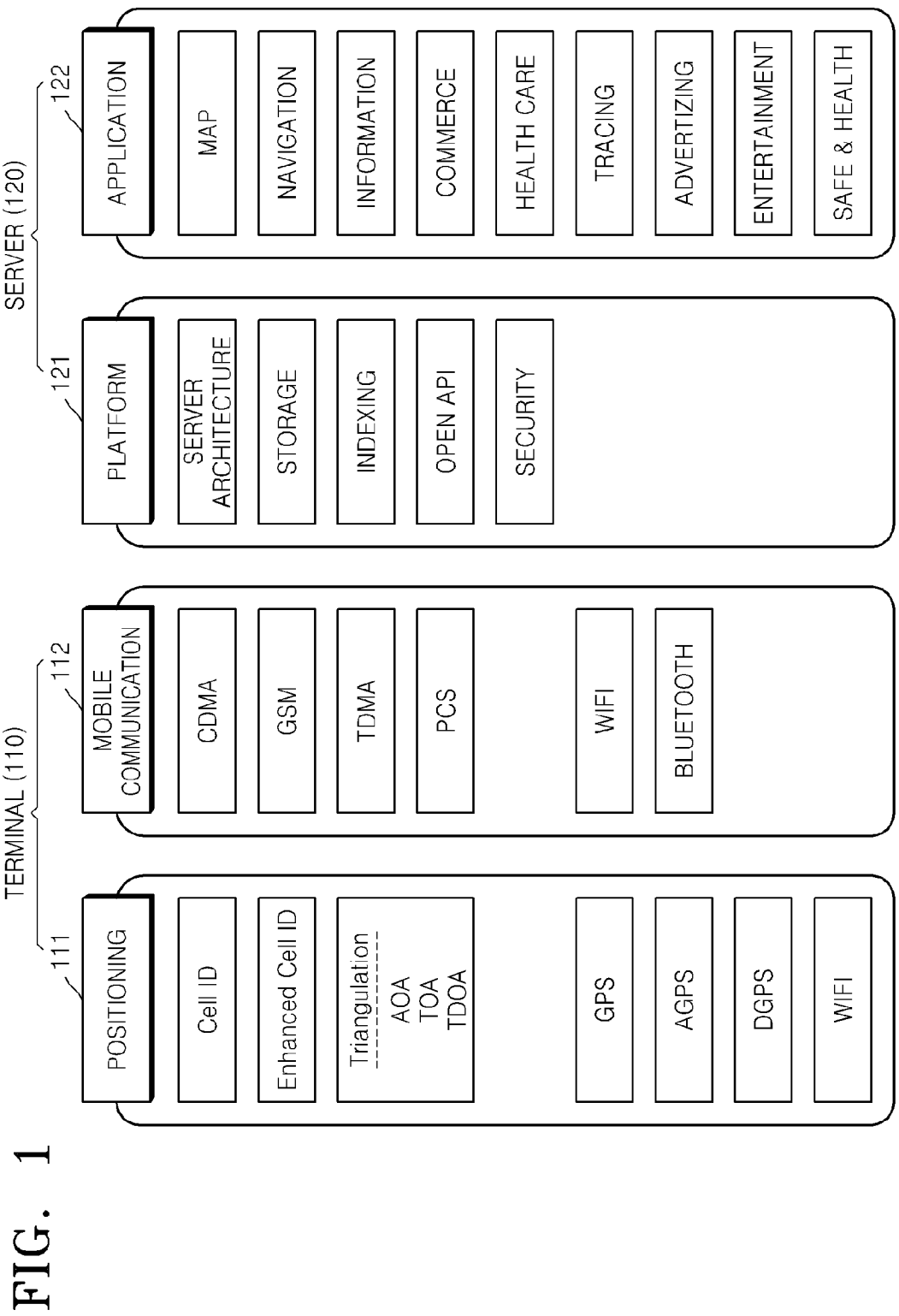
FIG. 1 is a schematic diagram of a system for providing a location-based service, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic diagram of a system for providing a location-based service, according to an embodiment of the present invention.

The system for providing a location-based service includes a terminal 110 and a server 120. The terminal 110 includes a positioning module 111 and a mobile communication module 112, and the server 120 includes a platform 121 and an application 122.

The positioning module 111 is a module for checking a location of the terminal 110 by using techniques such as cell IDentification (ID), enhanced cell ID, triangulation including Angle of Arrival (AoA), Time of Arrival (ToA), and Time Difference of Arrival (TDoA), Global Positioning System (GPS), Assisted GPS (AGPS), Differential GPS (DGPS), and Wireless Fidelity (WiFi). The structure of the positioning module 111 is not limited to that shown in this embodiment of the present invention.

The mobile communication module 112 is a module for performing communication between the terminal 110 and the server 120 using techniques relating to mobile communication, such as, for example, Code Division Multiple Access (CDMA), Global System for Mobile communications (GSM), Time Division Multiple Access (TDMA) or a Personal Communication Service (PCS), and techniques relating to Near Field Communication (NFC), such as WiFi or Bluetooth. The structure of the mobile communication module 112 is not limited to that shown in this embodiment of the present invention.

The platform 121 may include technologies such as a server architecture, a storage, indexing, an open Application Programmer Interface (API), and security. The server architecture technology refers to a location-based processing technique that corresponds to a location-based function. The location-based function includes, for example, obtaining a location from a location-obtaining server, responding to a location information request of the terminal 110 (client), managing location information, processing location information regarding an individual or a group, and tracing a movement path. The storage technology enables large-capacity storage and management. The indexing technology optimally organizes location information, or information regarding the location information, and constitutes the information so that it is easily searched. The open API technology enables websites to interact with each other by providing location information and information regarding the location information. The security technology controls user access, such as user profile management, authorization, and security. The structure of the platform 121 is not limited to that shown in this embodiment of the present invention.

The application 122 provides a location-based service to the terminal 110. Examples of the application 122 include, for example, map, navigation, information, commerce, health care, tracing, advertizing, entertainment, health and safety. The structure of the application 122 is not limited to that shown in this embodiment of the present invention.

FIG. 2 is a flowchart illustrating a method of controlling a device, according to an embodiment of the present invention.

Referring to FIG. 2, an apparatus for performing a method of controlling a device (or an 'apparatus for controlling a device') receives particular information regarding a wireless transceiver from the wireless transceiver, in step 210. In this embodiment of the present invention, the apparatus for controlling a device is included in a terminal, such as, for example, a user's mobile device. The wireless transceiver broadcasts a transmission signal, which includes the particular information regarding the wireless transceiver. In this embodiment of the present invention, the wireless transceiver may be a beacon or an Access Point (AP). Also, in this embodiment of the present invention, the particular information regarding the wireless transceiver may include at least one of Medium Access Control (MAC) address information, Service Set IDentification (SSID) information, and Basic Service Set IDentification (BSSID) information.

In step 220, when predetermined information included in the particular information is identical with previously-stored particular information, the apparatus for controlling a device controls a predetermined sensor that is attached to the terminal, which includes the apparatus for controlling a device. When a predetermined tag is in a predetermined field of the received particular information regarding the wireless transceiver, the apparatus for controlling a device activates or turns on the sensor of the terminal relating to the predetermined tag. For example, when it is assumed that a predetermined tag 'MacDonald' is previously stored in the terminal and a tag 'MacDonald, Kangnam store' is in the received SSID information, the predetermined tag is identical with the tag and the terminal turns on a sensor relating to 'MacDonald'. The terminal activates an NFC sensor that may provide a function, such as ordering or payment relating to 'MacDonald'. The sensor may be an NFC chip, a wireless transceiver scanning device, a microphone, a camera, a vibration sensor, or the like. However, the type of the sensor described herein is just an example, and the embodiments of the present invention are not limited thereto.

In step 230, the terminal receives a service relating to the predetermined sensor. The terminal receives a service relating to the activated sensor from a server or a wireless transceiver that is disposed close to the terminal. For example, when the NFC sensor is activated at a fast food store, the terminal downloads a service relating to ordering or payment from the NFC sensor.

In FIG. 2, when the terminal enters a coverage zone of the wireless transceiver without activating a sensor when executing or setting an additional application, such as an NFC sensor, the sensor may be automatically activated.

FIG. 3 is a flowchart illustrating a method of controlling a device, according to another embodiment of the present invention.

Referring to FIG. 3, an apparatus for performing a method of controlling a device receives, from a first external device, particular information regarding a second external device that is received by the first external device, in step 310. In this embodiment of the present invention, the apparatus for controlling a device may be a server, and the first external device may be a terminal that is disposed close to the second external device, receives particular information regarding the second external device and includes a sensor attached to the terminal, and the second external device may be a wireless transceiver. The wireless transceiver broadcasts a transmission signal, which includes particular information regarding the wireless transceiver. In this embodiment of the present invention, the wireless transceiver may be a beacon or an AP. Also, in this embodiment of the present invention, the particular information regarding the wireless transceiver may include at least one of MAC address information, SSID information, and BSSID information.

In step 320, the apparatus for controlling a device authenticates the second external device based on the particular information regarding the second external device. The apparatus for controlling a device checks whether the MAC address information or the SSID information regarding the wireless transceiver is identical to authentication information that is stored in the apparatus for controlling a device. When it is determined that the MAC address information or the SSID information regarding the wireless transceiver is identical to the authentication information, the apparatus for controlling a device authenticates the wireless transceiver.

In step 330, the apparatus for controlling a device detects position information regarding the authenticated second external device. Position information regarding the wireless transceiver is previously stored in the apparatus for controlling a device. The apparatus for controlling a device detects position information that corresponds to the position information regarding the authenticated wireless transceiver.

In step 340, the apparatus for controlling a device transmits control information regarding the first external device based on the detected position information. The control information regarding the first external device may be control information that is used in controlling the sensor that is attached to the first external device. For example, the control information that is used in controlling the sensor attached to the first external device is control information that is used in activating or turning on a predetermined sensor attached to the first external device. For example, when the position information regarding the wireless transceiver is 'MacDonald, Kangnam store', the apparatus for controlling a device transmits instructions for turning on the sensor of the terminal relating to 'MacDonald' to the terminal. Next, the terminal turns on the sensor according to the received instructions. For example, the terminal activates an NFC sensor that may provide a function, such as ordering or payment. The sensor may be an NFC chip, a wireless transceiver scanning device, a microphone, a camera, a vibration chip, or the like. However, the type of the sensor is not limited thereto in the embodiments of the present invention.

According to another embodiment of the present invention, the apparatus for controlling a device may transmit control information that is used in deactivating or turning off the predetermined sensor attached to the first external device.

Specifically, when the terminal is disposed close to the wireless transceiver, the terminal may automatically control a sensor by using the apparatus for controlling a device, the sensor providing a service relating to the wireless transceiver.

The apparatus for controlling a device provides a service relating to the sensor attached to the first external device after transmitting the control information. For example, when the wireless transceiver is a wireless transceiver relating to 'MacDonald, Kangnam store', the apparatus for controlling a device transmits a service relating to ordering or payment. In this embodiment of the present invention, the service may be provided by an external service provider relating to the service.

Figure 4:
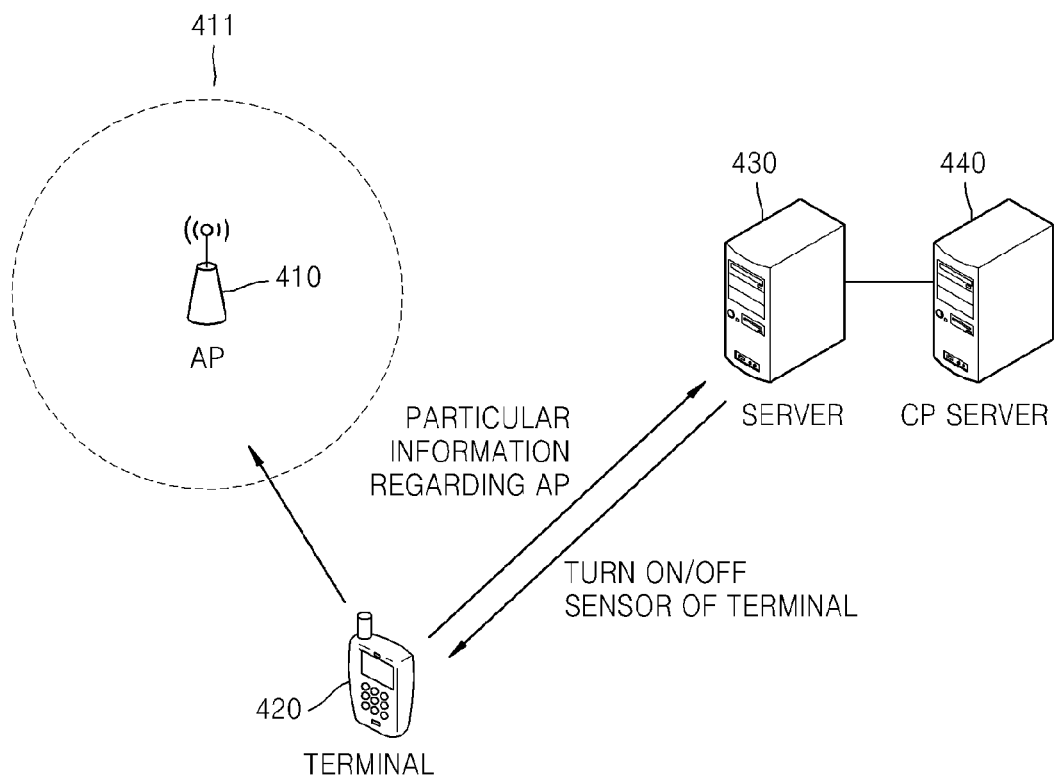
FIG. 4 is a diagram illustrating a system for controlling a device, according to an embodiment of the present invention.

FIG. 4 is a diagram illustrating a system of controlling a device, according to an embodiment of the present invention.

Referring to FIG. 4, when a terminal 420 enters a coverage zone 411 of an AP 410, the terminal 420 receives, from the AP 410, MAC address information and/or SSID information that is particular information regarding the AP 410. The terminal 420 transmits the received particular information regarding the AP 410 to a server 430. The server 430 authenticates the AP 410, detects position information regarding the AP 410, and transmits instructions for turning on or off a sensor of the terminal 420, to the terminal 420. The terminal 420 turns on or off the sensor according to the received instructions. The server 430 transmits a service, relating to the sensor, to the terminal 420. In an embodiment of the present invention, the server 430 may receive information regarding the service from a CP server 440.

Figure 5:
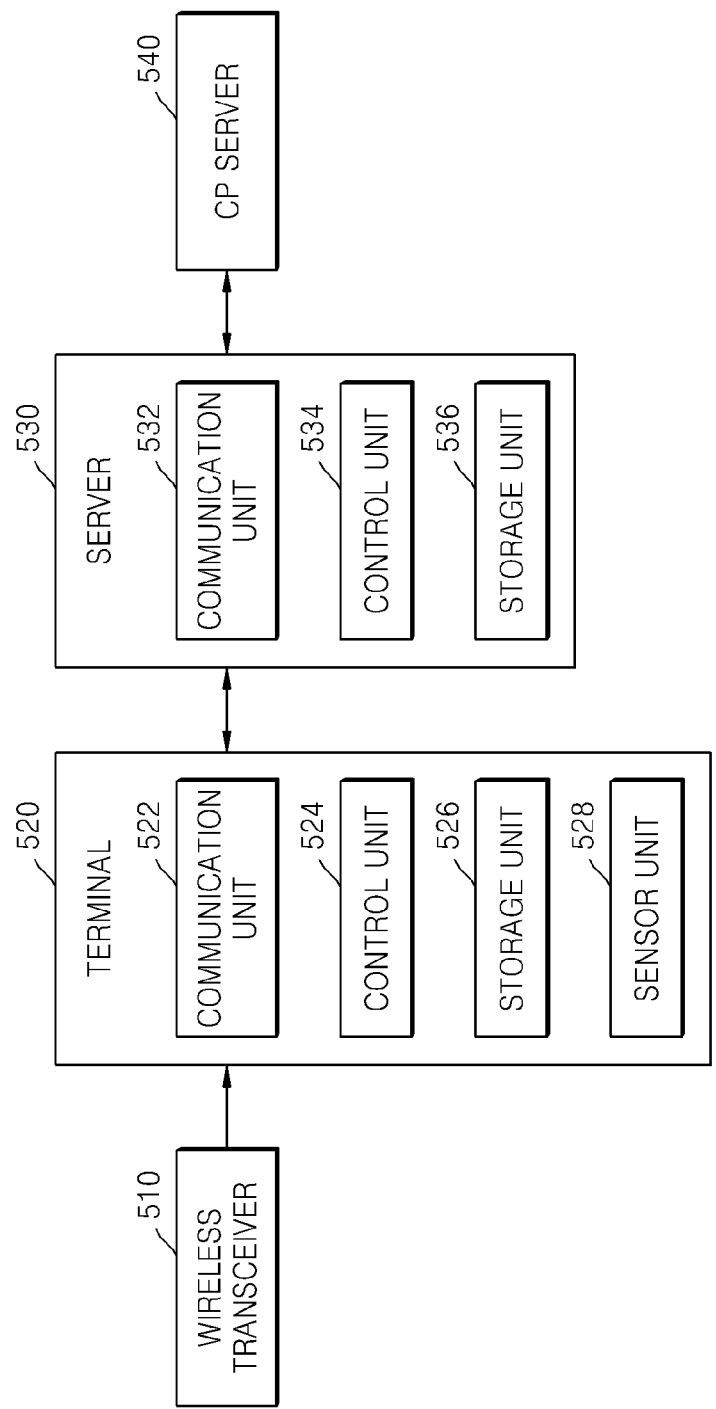
FIG. 5 is a block diagram of an apparatus for controlling a device, according to an embodiment of the present invention.

FIG. 5 is a block diagram illustrating an apparatus for controlling a device, according to an embodiment of the present invention.

Referring to FIG. 5, a terminal 520 is disposed close to a wireless transceiver 510. The terminal 520 includes a communication unit 522, a control unit 524, a storage unit 526, and a sensor unit 528. A server 530 includes a communication unit 532, a control unit 534, and a storage unit 536.

The communication unit 522 of the terminal 520 receives particular information regarding the wireless transceiver 510 from the wireless transceiver 510. The wireless transceiver 510 broadcasts a transmission signal including the particular information regarding the wireless transceiver 510. In this embodiment of the present invention, the wireless transceiver 510 may be a beacon or an AP. Further, in this embodiment of the present invention, the particular information regarding the wireless transceiver 510 may include at least one of MAC address information, SSID information, and BSSID information.

When predetermined information included in the particular information is identical to predetermined information stored in the storage unit 526 of the terminal 520, the control unit 524 of the terminal 520 controls a predetermined sensor included in the sensor unit 528. When a predetermined tag is in a predetermined field of the received particular information regarding the wireless transceiver 510, the control unit 524 of the terminal 520 activates or turns on the sensor of the terminal relating to the predetermined tag included in the sensor unit 528. For example, when it is assumed that a predetermined tag 'MacDonald' is previously stored in the storage unit 526 of the terminal 520 and a tag 'MacDonald, Kangnam store' is in the received SSID information, the predetermined tag is identical to the tag, and the control unit 524 of the terminal 520 may turn on the sensor of the sensor unit 528 relating to 'MacDonald'. For example, the control unit 524 of the terminal 520 may activate an NFC sensor of the sensor unit 528 that may provide a function, such as ordering or payment, relating to 'MacDonald'. The sensor may be an NFC chip, a wireless transceiver scanning device, a microphone, a camera, a vibration sensor, or the like. However, the type of the sensor is not limited to that described with respect to this embodiment of the present invention. When the terminal 520 enters a coverage zone of the wireless transceiver 510 without activating a sensor when executing or setting an additional application, such as an NFC sensor, the sensor may be automatically activated.

According to another embodiment of the present invention, the communication unit 522 of the terminal 520 transmits the received particular information regarding the wireless transceiver 510 to the server 530, and the communication unit 532 of the server 530 receives the particular information regarding the wireless transceiver 510.

The control unit 534 of the server 530 authenticates the wireless transceiver 510 based on the received particular information regarding the wireless transceiver 510. The control unit 534 of the server 530 checks whether the MAC address information or the SSID information regarding the wireless transceiver 510 is identical to authentication information that is stored in the storage unit 536 of the server 530. When it is determined that the MAC address information or the SSID information regarding the wireless transceiver 510 is identical to the authentication information, the control unit 534 of the server 530 authenticates the wireless transceiver 510.

The control unit 534 of the server 530 detects position information regarding the authenticated second external device. The position information regarding the wireless transceiver 510 is previously stored in the storage unit 536 of the server 530. The control unit 534 of the server 530 detects position information that corresponds to the position information regarding the authenticated wireless transceiver 510.

The control unit 534 of the server 530 transmits control information regarding the terminal 520 based on the detected position information. The control information regarding the terminal 520 may be control information that is used in controlling the sensor attached to the terminal 520. For example, the control information that is used in controlling the sensor attached to the terminal 520 may be control information that is used in activating or turning on a predetermined sensor attached to the terminal 520. For example, when the position information regarding the wireless transceiver 510 is 'MacDonald, Kangnam store', the control unit 534 of the server 530 transmits instructions for turning on the predetermined sensor of the terminal relating to 'MacDonald', to the terminal 520. The terminal 520 turns on the sensor of the sensor unit 528 according to the received instructions. For example, the terminal 520 activates an NFC sensor of the sensor unit 528 that may provide a function, such as ordering or payment. The sensor may be an NFC chip, a wireless transceiver scanning device, a microphone, a camera, a vibration chip, or the like. However, the type of the sensor is not limited to that described with respect to this embodiment of the present invention. In addition, the control unit 534 of the server 530 may transmit control information that is used in deactivating or turning off the sensor attached to the terminal 520. In this way, when the terminal 520 is disposed close to the wireless transceiver 510, the terminal 520 may automatically control the sensor by using the server 530, the sensor providing a service relating to the wireless transceiver 510.

The control unit 534 of the server 530 provides a service relating to the sensor attached to the terminal 520 after transmitting the control information. For example, when the wireless transceiver 510 is a wireless transceiver 510 relating to 'MacDonald, Kangnam store', the control unit 534 of the server 530 transmits a service relating to ordering or payment to the terminal 520 via the communication unit 532 of the server 530. In this case, the service may be provided by an external service provider 540 relating to the service.

The embodiments of the present invention can also be embodied as computer-readable codes on a computer-readable recording medium. The computer-readable recording medium is any data storage device that can store data that can be thereafter read by a computer system. Examples of the computer-readable recording medium include Read-Only Memory (ROM), Random-Access Memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

While the invention has been shown and described with reference to certain embodiments thereof, it will be understood by those skilled in the art that various changes in form and detail may be made therein without departing from the spirit and scope of the invention as defined by the appended claims. The embodiments of the present invention should be considered in a descriptive sense only and not for purposes of limitation. Therefore, the scope of the present invention is defined not by the detailed description of the invention but by the appended claims, and all differences within the scope will be construed as being included in the present invention.

What is claimed is:

1. A method of controlling a device by a server, the method comprising the steps of:
    receiving, from a first external device, information regarding a second external device, which was received by the first external device;
    authenticating the second external device based on the information regarding the second external device;
    detecting position information regarding the second external device;
    transmitting, to the first external device, control information regarding the first external device to control a sensor predetermined for a service, wherein the control information is based on the position information; and
    providing, by the server, to the first external device, the service relating to the sensor,
    wherein the second external device comprises a wireless transceiver, and
    wherein the wireless transceiver comprises an Access Point (AP).

2. The method of claim 1, wherein the sensor is attached to the first external device.

3. The method of claim 1, further comprising receiving the service relating to the sensor from a service provider of the service.

4. The method of claim 1, wherein the control information comprises control information that is used to activate the sensor.

5. The method of claim 1, wherein the control information comprises control information that is used to deactivate the sensor.

6. The method of claim 1, wherein the information regarding the AP comprises at least one of Service Set IDentification (SSID) information and Medium Access Control (MAC) address information of the AP.

7. An apparatus for controlling a device, the apparatus comprising:
    a communication unit for receiving, from a first external device, information regarding a second external device, which was received by the first external device; and
    a control unit authenticating the second external device based on the information regarding the second external device, detecting position information regarding the second external device, and transmitting control information regarding the first external device to control a sensor predetermined for a service to the first external device, wherein the control information is based on the position information,
    wherein the control unit provides the service relating to the sensor to the first external device,
    wherein the second external device comprises a wireless transceiver, and
    wherein the wireless transceiver comprises an Access Point (AP).

8. The apparatus of claim 7, wherein the sensor is attached to the first external device.

9. The apparatus of claim 7, wherein the communication unit receives the service relating to the sensor from a service provider of the service.

10. The apparatus of claim 7, wherein the control information comprises control information that is used to activate the sensor.

11. The apparatus of claim 7, wherein the control information comprises control information that is used to deactivate the sensor.

12. The apparatus of claim 7, wherein the information regarding the AP comprises at least one of Service Set IDentification (SSID) information and Medium Access Control (MAC) address information of the AP.

13. A computer-readable non-transitory recording medium having recorded thereon a program for executing a method of controlling a device by a server, wherein the method comprises the operations of:
    receiving, from first external device, information regarding a second external device, which was received by the first external device;
    authenticating the second external device based on the information regarding the second external device;
    detecting position information regarding the second external device; and
    transmitting, to the first external device, control information regarding the first external device to control a sensor predetermined for a service, wherein the control information is based on the position information; and
    providing, by the server, to the first external device, the service relating to the sensor,
    wherein the second external device comprises a wireless transceiver, and
    wherein the wireless transceiver comprises an Access Point (AP).

* * * * *